(12) United States Patent
Kominami et al.

(10) Patent No.: US 12,049,353 B2
(45) Date of Patent: Jul. 30, 2024

(54) DISCHARGE SYSTEM, DISCHARGE DEVICE, UNMANNED AIRCRAFT, MANEUVERING SYSTEM, AND AEROSOL CONTAINER

(71) Applicant: Toyo Seikan Co., Ltd., Tokyo (JP)

(72) Inventors: Atsushi Kominami, Kanagawa (JP); Souji Araki, Kanagawa (JP)

(73) Assignee: Toyo Seikan Co., Ltd., Tokyo (JP)

( * ) Notice: Subject to any disclaimer, the term of this patent is extended or adjusted under 35 U.S.C. 154(b) by 368 days.

(21) Appl. No.: 17/629,392

(22) PCT Filed: Jul. 22, 2020

(86) PCT No.: PCT/JP2020/028579
§ 371 (c)(1),
(2) Date: Jan. 23, 2022

(87) PCT Pub. No.: WO2021/015277
PCT Pub. Date: Jan. 28, 2021

(65) Prior Publication Data
US 2022/0258956 A1    Aug. 18, 2022

(30) Foreign Application Priority Data
Jul. 23, 2019   (JP) ................. 2019-135202

(51) Int. Cl.
*B65D 83/56*   (2006.01)
*B64C 39/02*   (2023.01)
(Continued)

(52) U.S. Cl.
CPC ............ *B65D 83/56* (2013.01); *B64C 39/024* (2013.01); *B64D 1/18* (2013.01); *A01M 7/0003* (2013.01); *B64U 2101/60* (2023.01)

(58) Field of Classification Search
CPC ........ B65D 83/56; B64C 39/024; B64D 1/18; B64U 2101/60; A01M 7/0003
See application file for complete search history.

(56) References Cited

U.S. PATENT DOCUMENTS 4,044,227 A * 8/1977 Holm ................. G06K 7/0166
209/583
5,448,499 A * 9/1995 Palmer ................. G05D 21/02
700/266
(Continued)

FOREIGN PATENT DOCUMENTS

CN   107614121 A   1/2018
CN   109358643 A   2/2019
(Continued)

OTHER PUBLICATIONS

Office Action issued for counterpart Chinese Application 202080017038. 3, issued by The State Intellectual Property Office of People's Republic of China on Apr. 13, 2023.
(Continued)

*Primary Examiner* — Steven Lim
*Assistant Examiner* — Son M Tang

(57) ABSTRACT

A discharge system comprises: a container holding unit configured to hold a container; a discharge drive unit configured to discharge contents from the container; a container information acquisition unit configured to read container information applied to the container; a permission information processing unit configured to process the container information and acquire permission information; and a discharge control unit configured to limit or-enable discharge at the discharge drive unit according to the permission information. A discharge device of an aerosol container comprises the discharge system.

18 Claims, 21 Drawing Sheets

(51) Int. Cl.
B64D 1/18 (2006.01)
A01M 7/00 (2006.01)
B64U 101/60 (2023.01)

(56) References Cited

U.S. PATENT DOCUMENTS

| | | | | |
|---|---|---|---|---|
| 5,659,167 | A * | 8/1997 | Wang | G06K 7/1095 |
| | | | | 235/472.01 |
| 5,969,970 | A * | 10/1999 | Rhoades | B67D 7/346 |
| | | | | 700/266 |
| 6,502,916 | B1 | 1/2003 | Naka | |
| 11,885,952 | B2 * | 1/2024 | Chou | G01N 33/54386 |
| 2002/0100815 | A1 * | 8/2002 | Doebler | B05B 3/1064 |
| | | | | 239/146 |
| 2008/0180217 | A1 * | 7/2008 | Isabell | H01Q 9/26 |
| | | | | 29/600 |
| 2009/0243856 | A1 * | 10/2009 | Lee | G06Q 10/087 |
| | | | | 340/572.1 |
| 2009/0273448 | A1 * | 11/2009 | Tuttle | G06Q 30/06 |
| | | | | 340/10.3 |
| 2011/0050165 | A1 * | 3/2011 | Sato | G06K 19/0701 |
| | | | | 320/108 |
| 2011/0095087 | A1 * | 4/2011 | Master | B66F 9/0755 |
| | | | | 340/10.1 |
| 2011/0095871 | A1 * | 4/2011 | Kail | H04Q 9/00 |
| | | | | 340/10.6 |
| 2012/0173028 | A1 | 7/2012 | Wui | |
| 2012/0268837 | A1 * | 10/2012 | Rittenburg | G02B 25/002 |
| | | | | 359/811 |
| 2013/0036634 | A1 * | 2/2013 | Key | G09F 3/10 |
| | | | | 40/5 |
| 2014/0014679 | A1 * | 1/2014 | Napolitano | A47G 33/00 |
| | | | | 222/1 |
| 2014/0184390 | A1 * | 7/2014 | Elizondo, II | G06K 19/07786 |
| | | | | 340/10.1 |
| 2015/0206121 | A1 * | 7/2015 | Joseph | G07G 1/0072 |
| | | | | 705/26.8 |
| 2016/0189101 | A1 * | 6/2016 | Kantor | G08G 5/0026 |
| | | | | 705/338 |
| 2017/0032382 | A1 * | 2/2017 | Shulman | G06K 7/10861 |
| 2017/0053071 | A1 * | 2/2017 | Caputo | G06K 7/10366 |
| 2017/0129605 | A1 * | 5/2017 | Wu | B05B 12/02 |
| 2017/0158331 | A1 * | 6/2017 | Wu | B64C 39/024 |
| 2017/0265374 | A1 * | 9/2017 | Wintemute | A01M 7/0089 |
| 2018/0032699 | A1 * | 2/2018 | Carrender | G06K 19/07749 |
| 2018/0068567 | A1 * | 3/2018 | Gong | G05D 1/106 |
| 2018/0093284 | A1 * | 4/2018 | Harris | B64D 1/18 |
| 2019/0114925 | A1 * | 4/2019 | Schulman | G08G 5/0082 |
| 2021/0274774 | A1 * | 9/2021 | Pan | A01M 7/0089 |
| 2023/0363303 | A1 * | 11/2023 | Fujiwara | A01B 79/005 |

FOREIGN PATENT DOCUMENTS

| | | |
|---|---|---|
| EP | 0086029 A1 | 8/1983 |
| JP | 2000103087 A | 4/2000 |
| JP | 2007237111 A | 9/2007 |
| JP | 2013505015 A | 2/2013 |
| JP | 2019018589 A | 2/2019 |
| WO | 2019119202 A1 | 6/2019 |

OTHER PUBLICATIONS (ISA/237) Written Opinion of the International Search Authority for International Patent Application No. PCT/JP2020/028579, mailed by the Japan Patent Office on Sep. 24, 2020.

Office Action issued for counterpart Taiwanese Application 109124933, transmitted from the Taiwan Intellectual Property Office on Aug. 7, 2023(issued on Aug. 1, 2023).

* cited by examiner

40

DISCHARGE SYSTEM, DISCHARGE DEVICE, UNMANNED AIRCRAFT, MANEUVERING SYSTEM, AND AEROSOL CONTAINER

CROSS-REFERENCE TO RELATED APPLICATIONS

This application is a National Stage Entry of International Application No. PCT/JP2020/028579 filed on Jul. 22, 2020, which claims priority to Japanese Patent Application No. 2019-135202 filed on Jul. 23, 2019, the contents of each of which are hereby incorporated by reference in their entirety.

BACKGROUND

1. Technical Field

The present invention relates to a discharge system, a discharge device, an unmanned aircraft, a maneuvering system, and an aerosol container.

2. Related Art

Conventionally, the unmanned aircraft comprising a fluid jet nozzle is known (see, e.g., Patent Document 1).
Patent Document 1: Japanese Patent Application Publication No. 2019-18589

Technical Problem

The conventional unmanned aircraft having liquid matter mounted therein cannot prohibit spraying the liquid matter on a subject that is not an original target.

GENERAL DISCLOSURE

A first aspect of the present invention provides a discharge system comprising: a container holding unit configured to hold a container; a discharge drive unit configured to discharge contents from the container; a container information acquisition unit configured to read container information applied to the container; a permission information processing unit configured to process the container information and acquire permission information; and a discharge control unit configured to limit or release discharge at the discharge drive unit according to the permission information.

The container may be an aerosol container.

The discharge control unit may use position information included in the permission information for control.

The discharge control unit may use period information included in the permission information for control.

The discharge control unit may use user information of the aerosol container included in the permission information for control.

The discharge control unit may use term-of-use information of the aerosol container included in the permission information for control.

The discharge control unit may use residual amount information of the aerosol container included in the permission information for control.

The container information may include an encryption key to decode the permission information that is encrypted.

The container information may include authentication information for a computer required upon acquiring the permission information stored on the computer.

The container information may include identification information that enables an aerosol container to be individually identified.

The container information may include permission information.

The container information may be applied on the outer surface of the aerosol container in a readable manner by visual means.

Plural pieces of the container information may be arranged spaced apart in an outer circumferential direction of the aerosol container and at the same position in an axial direction.

The container information may be provided on the outer surface of the aerosol container and applied to a semiconductor device that is readable via telecommunications.

The container information acquisition unit may be provided to the container holding unit.

The container information acquisition unit may acquire container information via wireless communication.

The permission information processing unit may process the container information acquired by the container information acquisition unit. The permission information processing unit may acquire the permission information from the container information. The permission information processing unit may transmit the permission information to the discharge control unit.

The permission information processing unit may comprise means of communication with a computer that is provided externally. The permission information processing unit may acquire information including the permission information from the computer.

The permission information processing unit may comprise means of communication with the computer that is provided externally. The permission information processing unit may update content of the permission information.

A second aspect of the present invention provides a discharge device of an aerosol container, the discharge device comprising a discharge system.

A third aspect of the present invention provides an unmanned aircraft to which an aerosol container can be mounted, the unmanned aircraft comprising a discharge system.

A fourth aspect of the present invention provides a maneuvering system of an unmanned aircraft comprising the unmanned aircraft and auxiliary equipment of said unmanned aircraft.

A fifth aspect of the present invention provides an aerosol container having container information applied thereto required for acquisition processing of permission information, wherein the container information is concealed by releasable concealing means.

The concealing means may be provided by peelable coating.

The concealing means may be a peelable sticker.

The concealing means may be a communication jamming device for wireless communication.

The summary clause above does not recite all necessary features of the present invention. A sub-combination of a group of these features may also constitute the present invention.

DESCRIPTION OF EXEMPLARY EMBODIMENTS

While the present invention will be described below by means of the embodiments of the invention, these embodiments below are not intended to limit the invention defined by the claims. All combinations of features set forth in the embodiments are not necessarily essential to the solutions of the present invention.

Figure 1A:
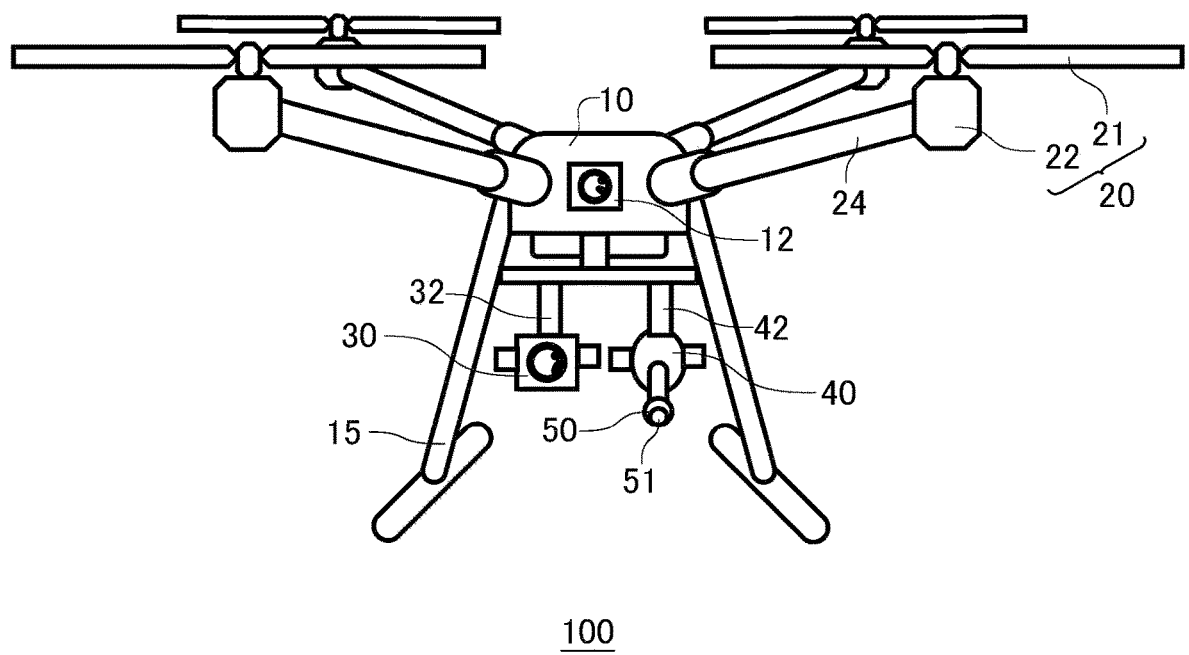
FIG. 1A shows an exemplary front view of an unmanned aircraft 100.
Figure 1B:
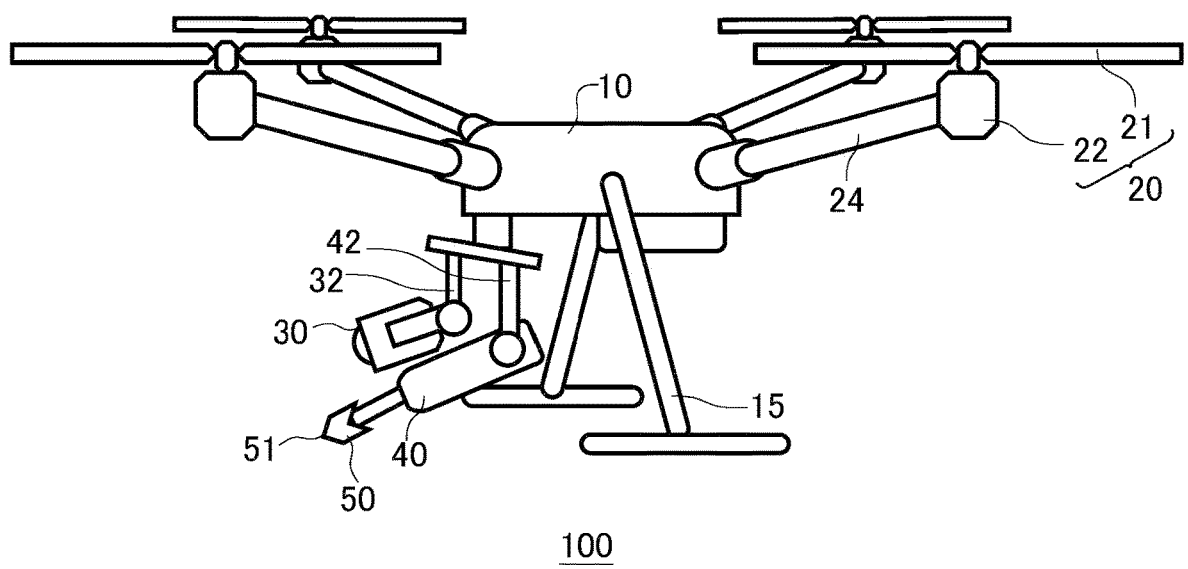
FIG. 1B shows an exemplary left side view of the unmanned aircraft 100 according to FIG. 1A.

FIG. 1A shows an exemplary front view of an unmanned aircraft 100. FIG. 1B shows an exemplary left side view of the unmanned aircraft 100 according to FIG. 1A.

The unmanned aircraft 100 is a flying vehicle that flies in the air. The unmanned aircraft 100 in this example comprises a body unit 10, a propelling unit 20, a movable camera 30, a container holding unit 40, and a discharge unit 50. While a face of the body unit 10 provided with a fixed camera 12 is referred to as a front face of the unmanned aircraft 100 in this specification, the flight direction is not limited to the front direction.

The body unit 10 stores various control circuits, a power supply, and the like of the unmanned aircraft 100. The body unit 10 may also function as a structure that couples components of the unmanned aircraft 100 with each other. The body unit 10 in this example is coupled to the propelling unit 20. The body unit 10 in this example comprises the fixed camera 12.

The fixed camera 12 is provided on a side of the body unit 10. The fixed camera 12 captures a video of the front view of the unmanned aircraft 100. In an example, the video captured by the fixed camera 12 is transmitted to a terminal device of the unmanned aircraft 100. An operator of the unmanned aircraft 100 may operate the unmanned aircraft 100 based on the video captured by the fixed camera 12. The operator of the unmanned aircraft 100 may also operate the unmanned aircraft 100 within a direct view.

The propelling unit 20 propels the unmanned aircraft 100. The propelling unit 20 has a rotary blade 21 and a rotation drive unit 22. The unmanned aircraft 100 in this example comprises four propelling units 20. The propelling unit 20 is attached to the body unit 10 via an arm unit 24. Note that the unmanned aircraft 100 may be a flying vehicle comprising fixed blades.

The propelling unit 20 generates propulsion force through the rotation of the rotary blade 21. While four rotary blades 21 are provided around the body unit 10, the method of arranging the rotary blades 21 is not limited to this example. The rotary blade 21 is provided on the tip of the arm unit 24 via the rotation drive unit 22.

The rotation drive units 22 have power sources such as motors to drive the rotary blades 21. The rotation drive units 22 may have brake mechanisms for the rotary blades 21. The rotary blade 21 and the rotation drive unit 22 may be attached directly to the body unit 10 without the arm unit 24.

The arm unit 24 is provided extending radially from the body unit 10. The unmanned aircraft 100 in this example comprises four arm units 24 provided corresponding to four propelling units 20. The arm unit 24 may be either fixed or movable. The arm unit 24 may have other configurations such as a camera fixed thereto.

The movable camera 30 captures a video of surroundings of the unmanned aircraft 100. The movable camera 30 in this example is provided below the body unit 10. In an example, the term below refers to the other side of the body unit 10 opposite to the side where the rotary blades 21 are provided. The movable camera 30 captures a video of a region different from the region captured by the fixed camera 12 provided on the body unit 10. For example, the movable camera 30 captures a video of the region smaller than the region captured by the fixed camera 12 in order to control discharge from the discharge unit 50. The movable camera 30 may also capture a video in a discharge direction of the discharge unit 50 while the fixed camera 12 captures a video in a advancing direction.

The unmanned aircraft 100 in this example comprises the fixed camera 12 for maneuvering and the movable camera 30 for controlling discharge, thereby facilitating operations by the operator. It can prevent the operator from being confused because there is no need to switch between an operation screen for maneuvering and an operation screen for controlling discharge. In addition, the surroundings of the unmanned aircraft 100 can be easily grasped while controlling discharge.

A coupling unit 32 couples the body unit 10 and the movable camera 30 with each other. The coupling unit 32 may be either fixed or movable. The coupling unit 32 may be a gimbal for controlling the position of the movable camera 30 in three axial directions. The coupling unit 32 may control the orientation of the movable camera 30 in coordination with the discharge direction of the discharge unit 50.

The container holding unit 40 holds a container 60, as will be described below, with contents being stored therein. The container holding unit 40 is coupled to the body unit 10 via a coupling unit 42. The container holding unit 40 may be coupled to a member other than the body unit 10, such as the arm unit 24 or a leg unit 15. In an example, the container holding unit 40 is a tubular sleeve that houses the container 60.

A material of the container holding unit 40 is not specifically limited as long as it can keep the shape of a housing unit for housing the container 60. For example, the material of the container holding unit 40 includes a high-strength, light-weight blank including metals such as aluminum, plastics, or carbon fibers. The material of the container holding unit 40 is not limited to hard materials, but may include soft materials such as rubber materials, e.g., silicone rubber or urethane foam. Note that the container holding unit 40 may comprise a heating mechanism to heat or keep the heat of the container 60.

The coupling unit 42 couples the body unit 10 and the container holding unit 40 with each other. The coupling unit 42 may be either fixed or movable. The coupling unit 42 may be a gimbal for controlling the position of the container holding unit 40 in three axial directions. In an example, the coupling unit 42 adjusts the discharge direction of the discharge unit 50 by moving the position of the container holding unit 40. Note that, by unifying the standards of the coupling unit 42, the container holding unit 40 can be replaced with any container holding unit according to the container 60. It allows different sizes or types of the containers 60 to be applicable.

The discharge unit 50 is connected with the container 60 and discharges the contents of the container 60. The contents may take any form of liquid, gas, or solid. The contents may be in any state such as powder, granules, or gel. The discharge unit 50 is an exemplary nozzle for discharging the contents. The discharge unit 50 has a discharge port 51 for discharging the contents of the container 60.

The leg unit 15 is coupled to the body unit 10 and keeps the posture of the unmanned aircraft 100 during landing. The leg unit 15 keeps the posture of the unmanned aircraft 100 while the propelling units 20 are turned off. The unmanned aircraft 100 in this example has two leg units 15. The leg unit 15 may have the movable camera 30 or the container holding unit 40 attached thereto.

Figure 2A:
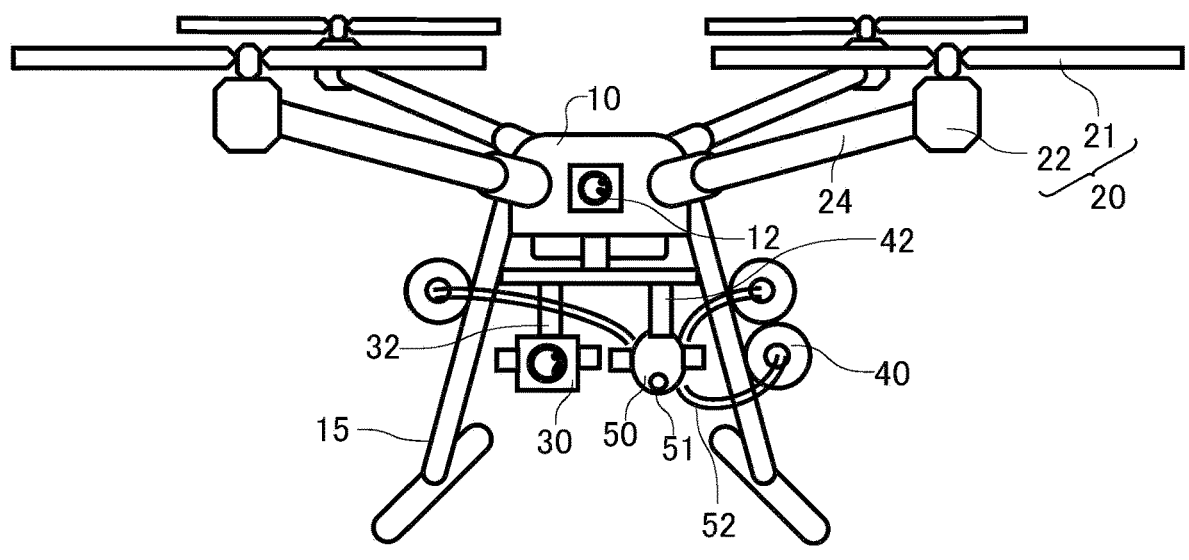
FIG. 2A shows another exemplary front view of the unmanned aircraft 100.
Figure 2B:
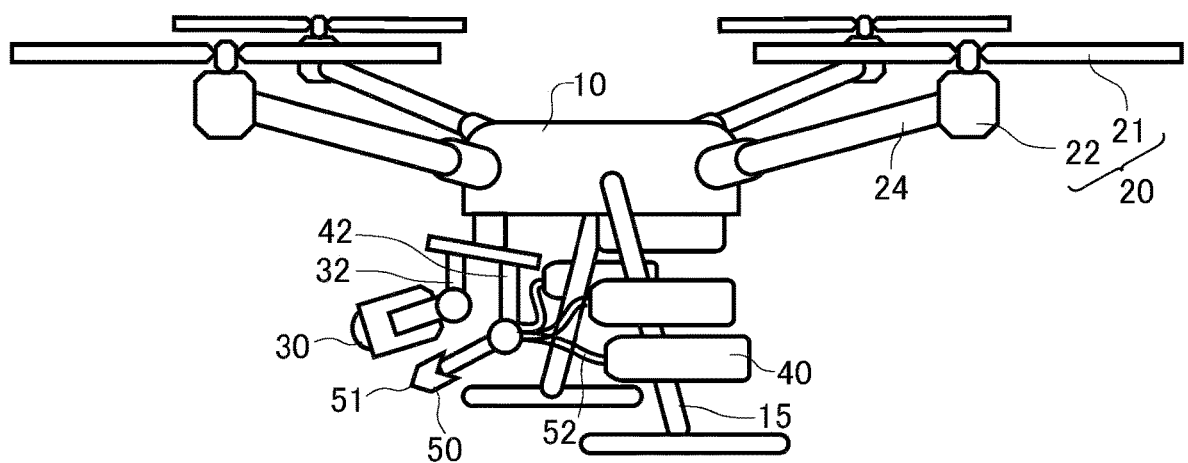
FIG. 2B shows a left side view of the unmanned aircraft 100 according to FIG. 2A.

FIG. 2A shows another exemplary front view of the unmanned aircraft 100. FIG. 2B shows a left side view of the unmanned aircraft 100 according to FIG. 2A. The unmanned aircraft 100 in this example is different from the example in FIG. 1A and FIG. 1B in that it comprises a plurality of container holding units 40. This example will describe specifically the difference from the example in FIG. 1A and FIG. 1B.

The plurality of container holding units 40 each comprises the container 60. The plurality of container holding units 40 may have the same kind of containers 60 or may respectively have different kinds of the containers 60. While the unmanned aircraft 100 in this example comprises three container holding units 40, the number of them is not limited thereto. The plurality of container holding units 40 are attached to the leg units 15. The plurality of container holding units 40 may be attached to the same leg unit 15 or may be attached to different leg units 15.

The discharge unit 50 is provided commonly to a plurality of containers 60. Here, the discharge unit 50 may be provided to each of the plurality of containers 60. The discharge unit 50 in this example is coupled to the body unit 10 by the coupling unit 42. The position of the discharge unit 50 may be adjusted by the coupling unit 42. The discharge unit 50 is connected with the container 60 by an extension unit 52 provided extending from the container 60.

The extension unit 52 is provided extending from the container 60 in the container holding unit 40 to the discharge unit 50. It allows the extension unit 52 to arrange the discharge unit 50 in an arbitrary position away from the container holding unit 40. It improves the freedom of layout for the unmanned aircraft 100. In addition, remotely controlling the discharge direction is facilitated by attaching the discharge unit 50 to the gimbal. The number of the extension units 52 to be provided may correspond to the number of the container holding units 40. In this example, each of three container holding units 40 is provided with one extension unit 52. The discharge unit 50 may perform discharge selectively from any of the plurality of containers 60 in time division or may perform discharge from the plurality of containers 60 simultaneously.

Figure 3A:
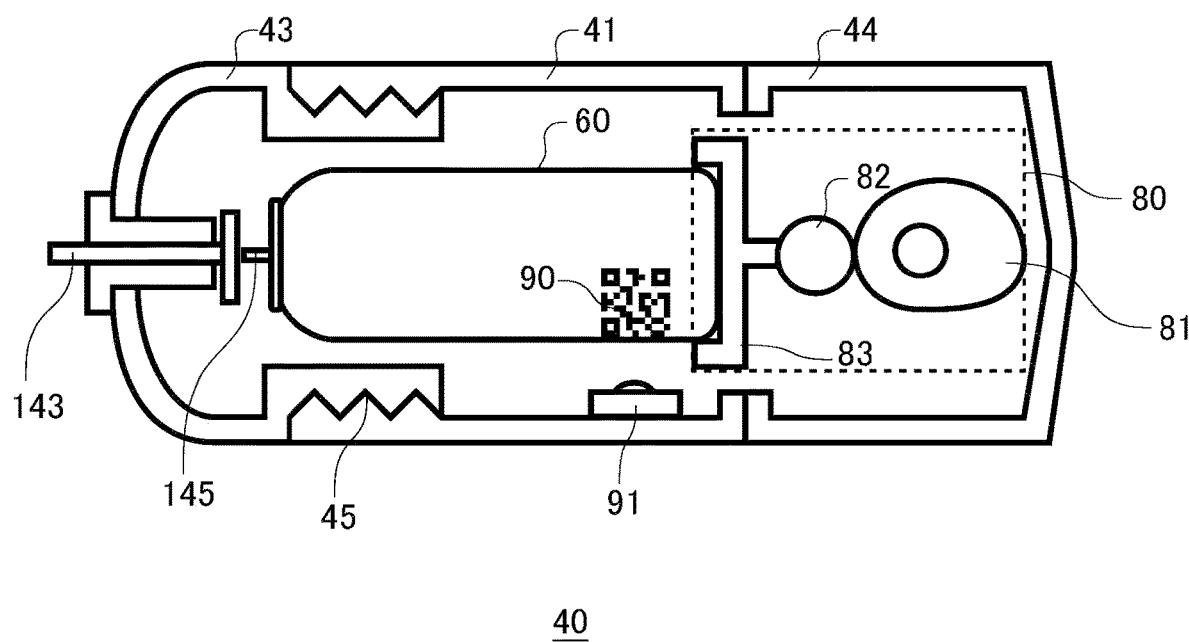
FIG. 3A shows an exemplary configuration of a container holding unit 40.

FIG. 3A shows an exemplary configuration of the container holding unit 40. FIG. 3A shows a cross sectional view of the container holding unit 40. The container holding unit 40 holds the container 60. The container holding unit 40 in this example comprises a body 41, a first end cover unit 43, and a second end cover unit 44. The container holding unit 40 also comprises a discharge drive unit 80 for controlling discharge from the container 60.

The container 60 may be an aerosol container that discharges the contents filled inside by means of gas pressure. For example, the container 60 ejects the contents by means of the gas pressure of liquefied gas or compressed gas filled inside. The container 60 in this example is an aerosol can made of metal. The container 60 may be a pressure-resistant plastic container. The container 60 is mounted in a housed state in the container holding unit 40. The container 60 is not limited to the aerosol container and may be a resin tank.

Note that a jetting agent to be used may include the liquefied gas such as hydrocarbon (liquefied petroleum gas) (LPG), dimethyl ether (DME), and hydrofluorocarbon (HFO-1234ze), and the compressed gas such as carbon dioxide ($CO_2$), nitrogen ($N_2$), and nitrogen monoxide ($N_2O$).

The body 41 has a cylindrical shape with a diameter larger than that of the container 60. The body 41 in this example is interposed between the first end cover unit 43 and the second end cover unit 44.

The first end cover unit 43 covers one end of the body 41. The first end cover unit 43 in this example covers the end on the jetting side of the container 60. The first end cover unit 43 is detachably screwed into the body 41 via a screw unit 45. The first end cover unit 43 in this example has a dome-shaped cover body. The first end cover unit 43 is tapered gradually in its diameter toward the tip by taking into account the aerodynamic characteristics. The first end cover unit 43 has a curved surface in the shape of a cone with a rounded tip or of a dome. Having such a shape with the excellent aerodynamic characteristics can reduce influence of a side wind and stabilize the flight.

The second end cover unit 44 covers the other end of the body 41 opposite to the end covered by the first end cover unit 43. The second end cover unit 44 in this example covers the end opposite to the jetting side of the container 60. The second end cover unit 44 is configured integrally with the body 41. The second end cover unit 44 may also be provided removably from the body 41.

The discharge drive unit 80 discharges the contents from the container 60. The discharge drive unit 80 is accommodated in the second end cover unit 44 located at the bottom side of the container 60. The second end cover unit 44 functions as an enclosure for the discharge drive unit 80. The discharge drive unit 80 comprises a cam 81, a cam follower 82, and a movable plate 83. Since the discharge drive unit 80 is provided in the container holding unit 40, there is no need to replace the discharge drive unit 80 when replacing the container 60.

The cam 81 is rotatively driven by a drive source. In an example, a motor is used as the drive source. The cam 81 has a structure having a varying distance from the center of rotation to the outer circumference. Note that, in the example shown, the shape of the cam 81 is exaggerated. The cam 81 contacts the cam follower 82 on the outer circumference.

The cam follower 82 is provided between the cam 81 and the movable plate 83. The cam follower 82 is connected to the cam 81 and the movable plate 83, and transmits a rotational movement of the cam 81 to the movable plate 83 as a linear movement.

The movable plate 83 is provided in contact with the bottom surface of the container 60 and controls opening and closing of a valve of the container 60. The movable plate 83 moves back and forth by means of the cam follower 82. For example, when the distance is shorter between the center of rotation of the cam 81 and a contact region of the cam 81 on which the cam follower 82 abuts, the movable plate 83 retracts with respect to the container 60 and the valve of the container 60 is closed. On the other hand, when the distance is longer between the center of rotation of the cam 81 and the contact region of the cam 81 on which the cam follower 82 abuts, the movable plate 83 advances with respect to the container 60 and the valve of the container 60 is opened.

Note that while the discharge drive unit 80 has a configuration where the cam mechanism transforms the rotational movement of the motor into the linear movement, the configuration is not limited to the cam mechanism. For example, the mechanism of the discharge drive unit 80 may be any mechanism that transforms the rotational movement of the motor into the linear movement, such as a screw feeding mechanism or a rack and pinion. In addition, the drive source may provide a linear motor for linear driving or an electromagnetic solenoid and the like, instead of the rotary motor.

A stem 145 is provided on the container 60. By the stem 145 being pressed by an actuator 143, the contents are discharged from the container 60. The actuator 143 has a flow path depending on the discharge direction and discharge state. In an example, the actuator 143 discharges the contents in a spray form.

Container information 90 is applied to the container 60. The container 60 has one piece of container information 90 applied thereto. The container information 90 is applied on the outer surface of the container 60 in a readable manner. For example, the container information 90 is applied to the container 60 in at least one manner including a character numerical sequence, a one-dimensional bar code, a two-dimensional bar code, image information (electronic watermark) that can decode a code, a hologram, an RF tag, and an NFC tag. In an example, the container information 90 is applied by pasting a sticker, attaching a shrink label, or drawing with a laser marker or IJP. The container information 90 may be applied to the container 60 by a can manufacturer of the container 60 or a filling trader of the contents. The container information 90 includes identification information $I_I$ that enables a container 60 to be individually identified.

The identification information $I_I$ is associated with information for individually specifying the container 60. For example, the identification information $I_I$ is associated with information regarding the time of manufacture, the place of manufacture, the contents, and the like for each container 60. The identification information $I_I$ may also include an individual identification code. The identification information $I_I$ may include the individual identification code that is numbered using a random character numerical sequence. The random character numerical sequence may be numbered using a hash value or a table of random numbers.

The identification information $I_I$ may also include a promotional campaign code. For example, the promotional campaign code includes information regarding the promotional campaign conducted by a dealer of the container 60. The identification information $I_I$ provides useful information to a user of the unmanned aircraft 100. For example, when the container 60 mounted to the unmanned aircraft 100 is used for spraying agricultural chemicals, the identification information $I_I$ includes a website address for information regarding agriculture. The information related to agriculture may include information such as the time and amount of spraying the agricultural chemicals filled in the container 60 or the knowledge regarding farm products.

A container information acquisition unit 91 reads the container information 90 applied to the container 60. The container information acquisition unit 91 is attached to an arbitrary position of the unmanned aircraft 100. The container information acquisition unit 91 in this example is provided at the position opposing to the side of the container 60 in the container holding unit 40. The container information acquisition unit 91 in this example is a camera that reads the container information 90 through visual means. Note that the container information acquisition unit 91 may be provided on the airframe of the unmanned aircraft 100 and read the container information 90 via wireless communication.

Note that while the container 60 is mounted directly to the container holding unit 40 in this example, the container 60 may be housed in a housing member and the housing member may be mounted to the container holding unit 40. In this case, the container information 90 may be applied to the housing member for housing the container 60. The housing member also protects the container 60 from impact, thereby increasing the safety at the time of accidents.

Since the container 60 in this example is the aerosol container, the container 60, even when it is emptied, can be easily replaced by mounting a new container 60. In addition, the contents are unlikely to adhere to human bodies, providing the excellent safety during replacement. Note that the unmanned aircraft 100 may determine whether the container 60 is mounted thereto based on the possibility of acquiring the container information 90.

Figure 3B:
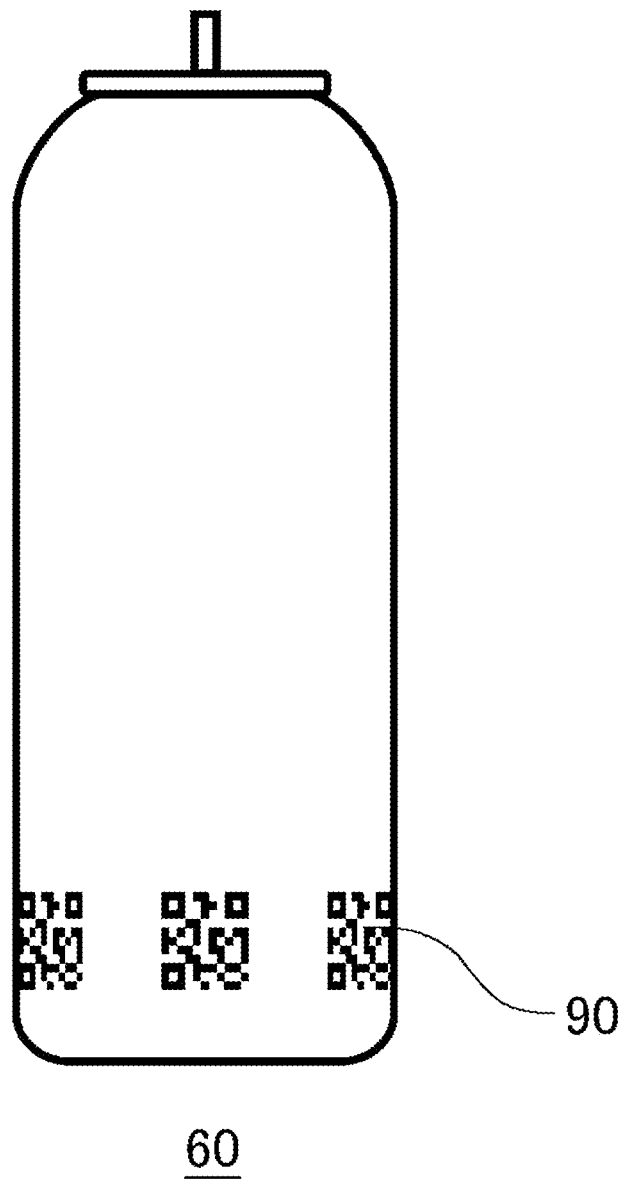
FIG. 3B shows an exemplary configuration of a container 60 having plural pieces of container information 90 applied thereto.

FIG. 3B shows an exemplary configuration of the container 60 having plural pieces of container information 90 applied thereto. This example will describe specifically the difference from the container 60 in FIG. 3A.

The plural pieces of container information 90 are arranged in a row in the outer circumferential direction of the container 60. The plural pieces of container information 90 are provided in a manner that they are arranged spaced apart in the outer circumferential direction of the container 60 and at the same position in the axial direction. For example, four pieces of container information 90 are provided spaced apart from each other by 90 degrees on the outer circumference of the container 60. This enables the container information acquisition unit 91 to acquire the container information 90 even when the container 60 is rotated in the outer circumferential direction inside the container holding unit 40. In addition, the container 60 may be inserted into the container holding unit 40 regardless of the orientation.

Figure 4A:
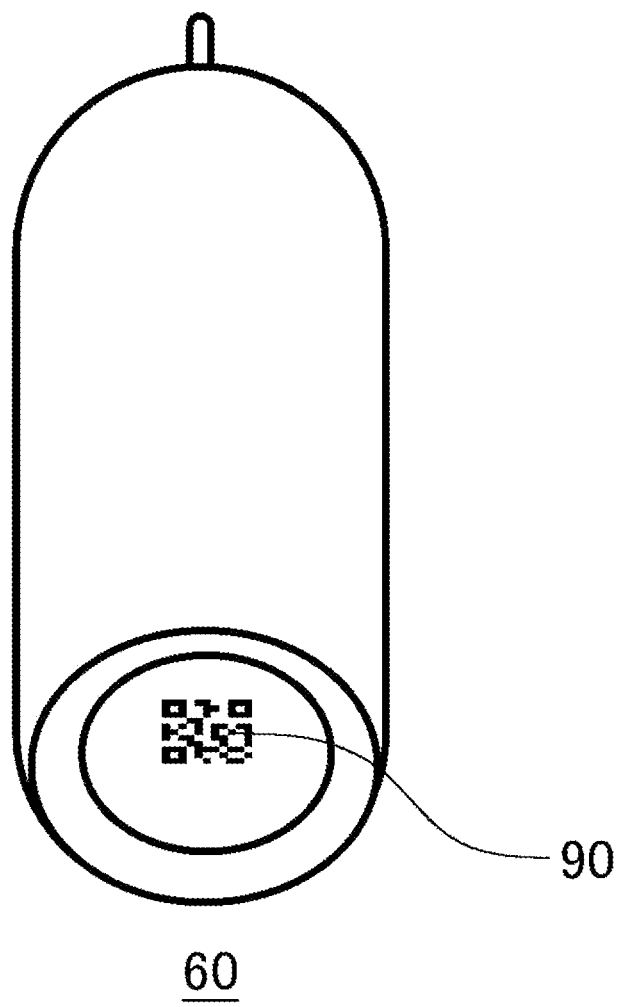
FIG. 4A shows an exemplary configuration of the container 60 having the container information 90 applied to the bottom surface.

FIG. 4A shows an exemplary configuration of the container 60 having the container information 90 applied to the bottom surface. The container information 90 is provided on the bottom surface of the container 60. This example will describe specifically the difference from the container 60 in FIG. 3A. Note that the container information 90 may also be provided on the side of the container 60 as shown in FIG. 3A or FIG. 3B.

Figure 4B:
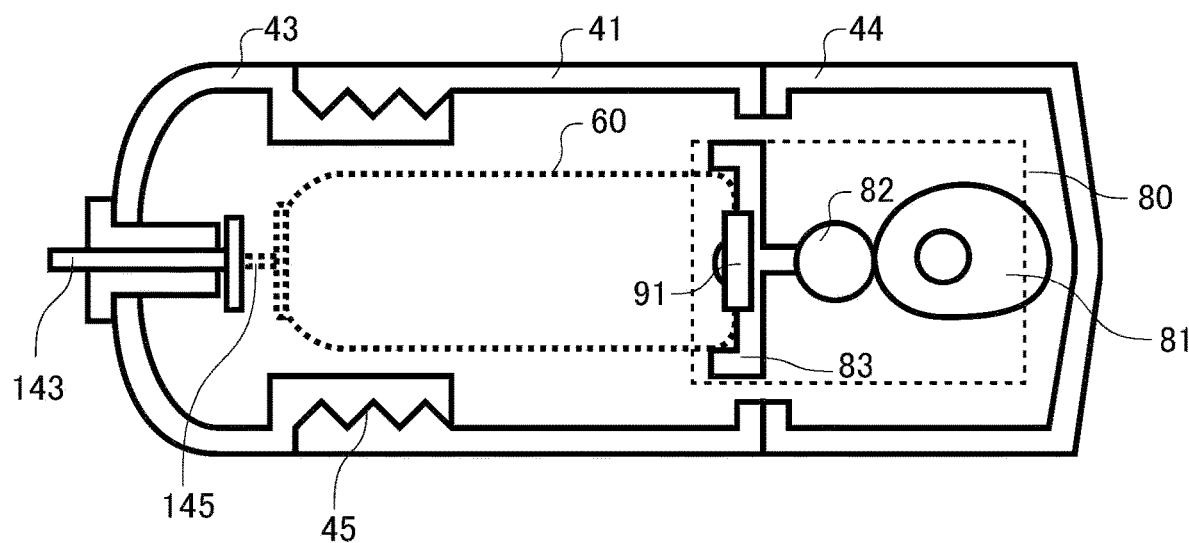
FIG. 4B shows an exemplary configuration of the container holding unit 40.

FIG. 4B shows an exemplary configuration of the container holding unit 40. The container holding unit 40 in this example reads the container information 90 provided on the bottom surface of the container 60 as shown in FIG. 4A.

The container information acquisition unit 91 is provided opposed to the bottom surface of the container 60 in the container holding unit 40. The container information acquisition unit 91 in this example is provided on a side of the movable plate 83 opposing to the bottom surface of the container 60. By providing the container information 90 on the bottom surface of the container 60, the container information acquisition unit 91 can acquire the container information 90 even when the position of the container 60 is moved by the discharge drive unit 80. The container information acquisition unit 91 can also acquire the container information 90 even when the container 60 is rotated in the container holding unit 40. The user can mount the container 60 to the container holding unit 40 regardless of the orientation of the container 60. Since the container information 90 is less visible, the design feature of the container 60 is also improved.

Figure 5:
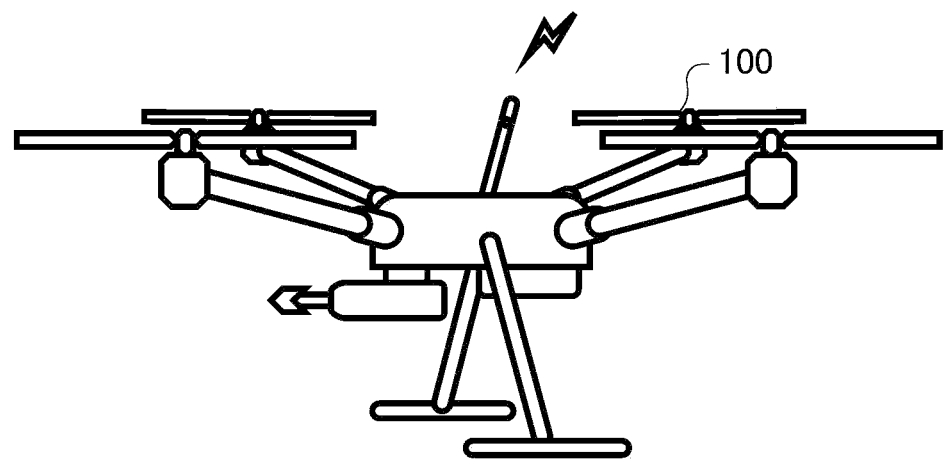
FIG. 5 shows an exemplary maneuvering system 300 of the unmanned aircraft 100.
Figure 5:
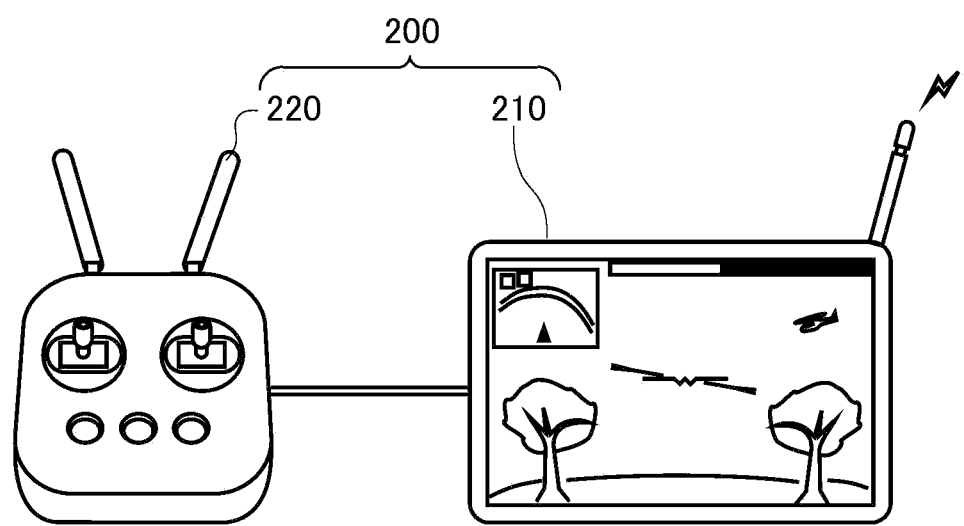

FIG. 5 shows an exemplary maneuvering system 300 of the unmanned aircraft 100. The maneuvering system 300 in this example comprises the unmanned aircraft 100 and a terminal device 200. The terminal device 200 includes a display unit 210 and a controller 220.

The display unit 210 displays the video captured by the camera mounted to the unmanned aircraft 100. The display unit 210 may display the videos captured by each of the fixed camera 12 and the movable camera 30. For example, the display unit 210 displays the videos from the fixed camera 12 and the movable camera 30 on a split screen. The display unit 210 may communicate directly with the unmanned aircraft 100, or may communicate indirectly with the unmanned aircraft 100 via the controller 220. The display unit 210 may be connected with an external server.

The controller 220 is operated by the user to maneuver the unmanned aircraft 100. In addition to the flight of the unmanned aircraft 100, the controller 220 may instruct the discharge unit 50 to discharge the contents. The controller 220 may be connected with the display unit 210 either by wired or wireless connection. The plurality of controllers 220 may be provided, which are used separately for maneuvering the unmanned aircraft 100 and for controlling discharge from the discharge unit 50.

Note that the user in this example uses the terminal device 200 to maneuver the unmanned aircraft 100 manually. However, the user may automatically, not manually, maneuver by a program. In addition, the user may maneuver the unmanned aircraft 100 while viewing it directly without using the screen displayed on the display unit 210. Moreover, the maneuver of the unmanned aircraft 100 may be controlled automatically while the discharge from the discharge unit 50 is manually operated.

Figure 6:
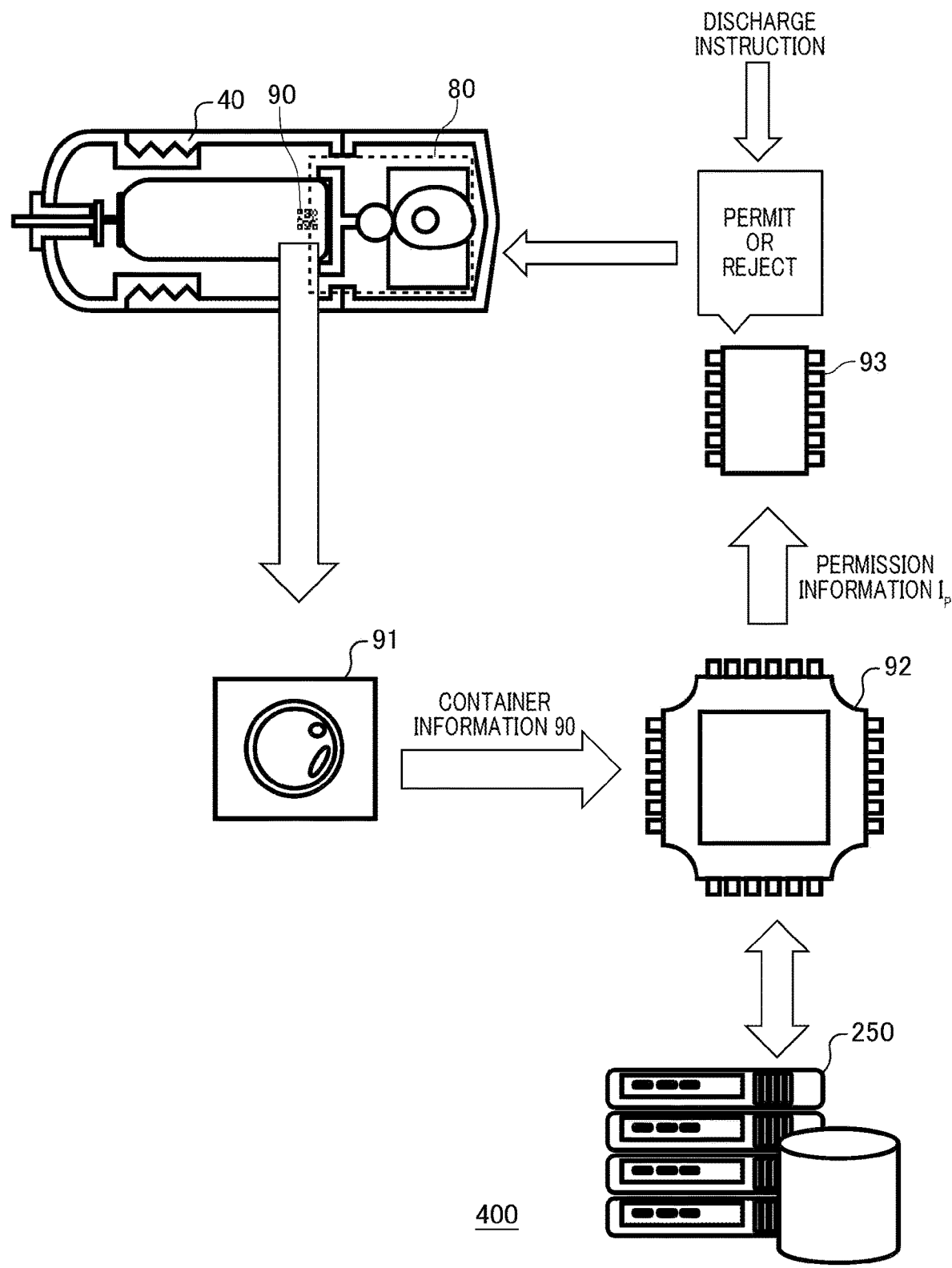
FIG. 6 shows an exemplary configuration of a discharge system 400.

FIG. 6 shows an exemplary configuration of a discharge system 400. The discharge system 400 comprises the container holding unit 40, the discharge drive unit 80, the container information acquisition unit 91, a permission information processing unit 92, and a discharge control unit 93.

The container information acquisition unit 91 reads the container information 90 applied to the container 60. The container information acquisition unit 91 may be provided to the container holding unit 40 or may be provided on the airframe of the unmanned aircraft 100. The container information acquisition unit 91 transmits the container information 90 to the permission information processing unit 92.

The permission information processing unit 92 processes the container information 90 to acquire permission information $I_P$. The permission information $I_P$ is the information for permitting discharge from the discharge unit 50. The permission information processing unit 92 in this example communicates with a computer 250 provided external to the unmanned aircraft 100. In an example, the permission information processing unit 92 transmits the acquired container information 90 to the computer 250 to acquire the permission information $I_P$ from the computer 250.

The computer 250 has the permission information $I_P$ corresponding to the container information 90. In an example, the computer 250 is a server including a database of the permission information $I_P$ and transmits the permission information $I_P$ corresponding to the container information 90 to the permission information processing unit 92. Note that a plurality of computers 250 may be provided in terms of information protection. For example, the computer 250 includes at least one of a database of a can manufacturing company, a database of a filling company, a database of a construction company, or a permission database of a ministry or public office.

The discharge control unit 93 acquires the permission information $I_P$ from the permission information processing unit 92. The discharge control unit 93 limits or enables discharge at the discharge unit 50 according to the permission information $I_P$. For example, the discharge control unit 93 acquires comparison information $I_C$ for being compared with the permission information $I_P$ such as current position information. The discharge control unit 93 compares the permission information $I_P$ with the comparison information $I_C$ and permits discharge when a condition of the permission information $I_P$ is met. The discharge control unit 93 permits a discharge instruction to drive the discharge drive unit 80 to discharge the contents from the container 60 if the condition of the permission information $I_P$ is met, or the discharge control unit 93 rejects the discharge instruction to limit discharge if the condition of the permission information $I_P$ is not met.

For example, the permission information $I_P$ includes information regarding a region in which discharge is permitted. In this case, the discharge control unit 93 acquires the current position information of the unmanned aircraft 100 as the comparison information $I_C$. The discharge control unit 93 permits discharge when the unmanned aircraft 100 is located in the region in which discharge by the unmanned aircraft 100 is permitted. On the other hand, the discharge control unit 93 limits discharge in a region other than the region in which discharge is permitted.

In addition, the permission information $I_P$ may include user information of the container 60. The discharge control unit 93 uses the user information of the container 60 for control. The discharge control unit 93 permits discharge when the user of the unmanned aircraft 100 meets a user condition included in the permission information $I_P$.

In addition, the permission information $I_P$ may include term-of-use information of the container 60. The discharge control unit 93 uses the term-of-use information of the container 60 for control. The discharge control unit 93 permits discharge when the term of use of the container 60 meets the term of use included in the permission information $I_P$. Note that, if a plurality of conditions are received as the permission information $I_P$, the discharge control unit 93 may limit discharge when any of the conditions does not permit discharge.

Figure 7:
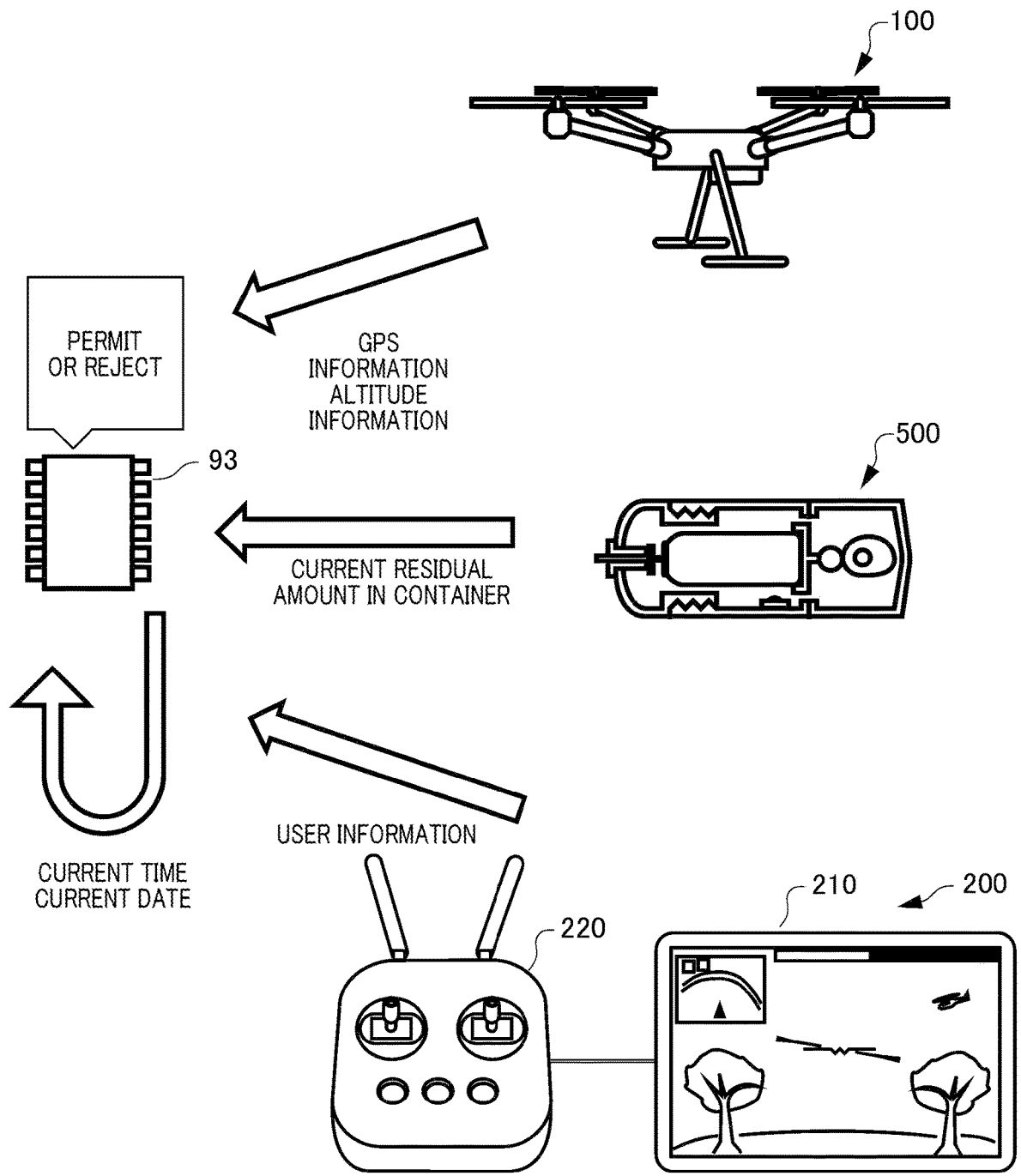
FIG. 7 shows exemplary comparison information $I_C$ to be acquired by a discharge control unit 93.

FIG. 7 shows exemplary comparison information $I_C$ to be acquired by the discharge control unit 93. The discharge control unit 93 compares the permission information $I_P$ with the comparison information $I_C$ to determine whether the discharge is permitted.

The discharge control unit 93 acquires the comparison information $I_C$ from any of the unmanned aircraft 100, a discharge device 500, or the terminal device 200. In addition, the discharge control unit 93 may have a function to voluntarily produce the comparison information $I_C$.

The unmanned aircraft 100 acquires information regarding the position of the unmanned aircraft 100. The position information may include GPS information or altitude information. In an example, the unmanned aircraft 100 acquires the position information from a flight control unit such as a flight controller. The unmanned aircraft 100 transmits the acquired information to the discharge control unit 93 as the comparison information $I_C$. The discharge control unit 93 permits discharge when the comparison information $I_C$ from the unmanned aircraft 100 meets the condition included in the permission information $I_P$. The discharge control unit 93 limits discharge when the comparison information $I_C$ from the unmanned aircraft 100 does not meet the condition included in the permission information $I_P$. In this manner, the discharge control unit 93 may use the position information included in the permission information $I_P$ for control.

The discharge device 500 acquires information regarding a residual amount in the container 60. In an example, the discharge device 500 acquires the residual amount in the container 60 based on a capacity of the container 60 and a total discharge time. The discharge device 500 transmits the acquired information to the discharge control unit 93 as the comparison information $I_C$. The discharge control unit 93 permits discharge when the residual amount in the container 60 meets the condition included in the permission information $I_P$. The discharge control unit 93 limits discharge when the residual amount in the container 60 does not meet the condition included in the permission information $I_P$. In this manner, the discharge control unit 93 may use the information on the residual amount in the container 60 included in the permission information $I_P$ for control. It allows, for example, preventing a malicious person from filling harmful contents in an empty container 60 and misusing it.

The terminal device 200 acquires information regarding the user. The terminal device 200 transmits the acquired information to the discharge control unit 93 as the comparison information $I_C$. The discharge control unit 93 permits discharge when the information regarding the user matches the condition included in the permission information $I_P$. The discharge control unit 93 limits discharge when the information regarding the user does not meet the condition included in the permission information $I_P$. In this manner, the discharge control unit 93 may use the user information of the container 60 included in the permission information $I_P$ for control.

The discharge control unit 93 may incorporate a function for acquiring a current time or a current date. In this case, the discharge control unit 93 uses period information included in the permission information $I_P$ for control. In addition, the discharge control unit 93 may use term-of-use information of the container 60 included in the permission information $I_P$ for control.

Figure 8A:
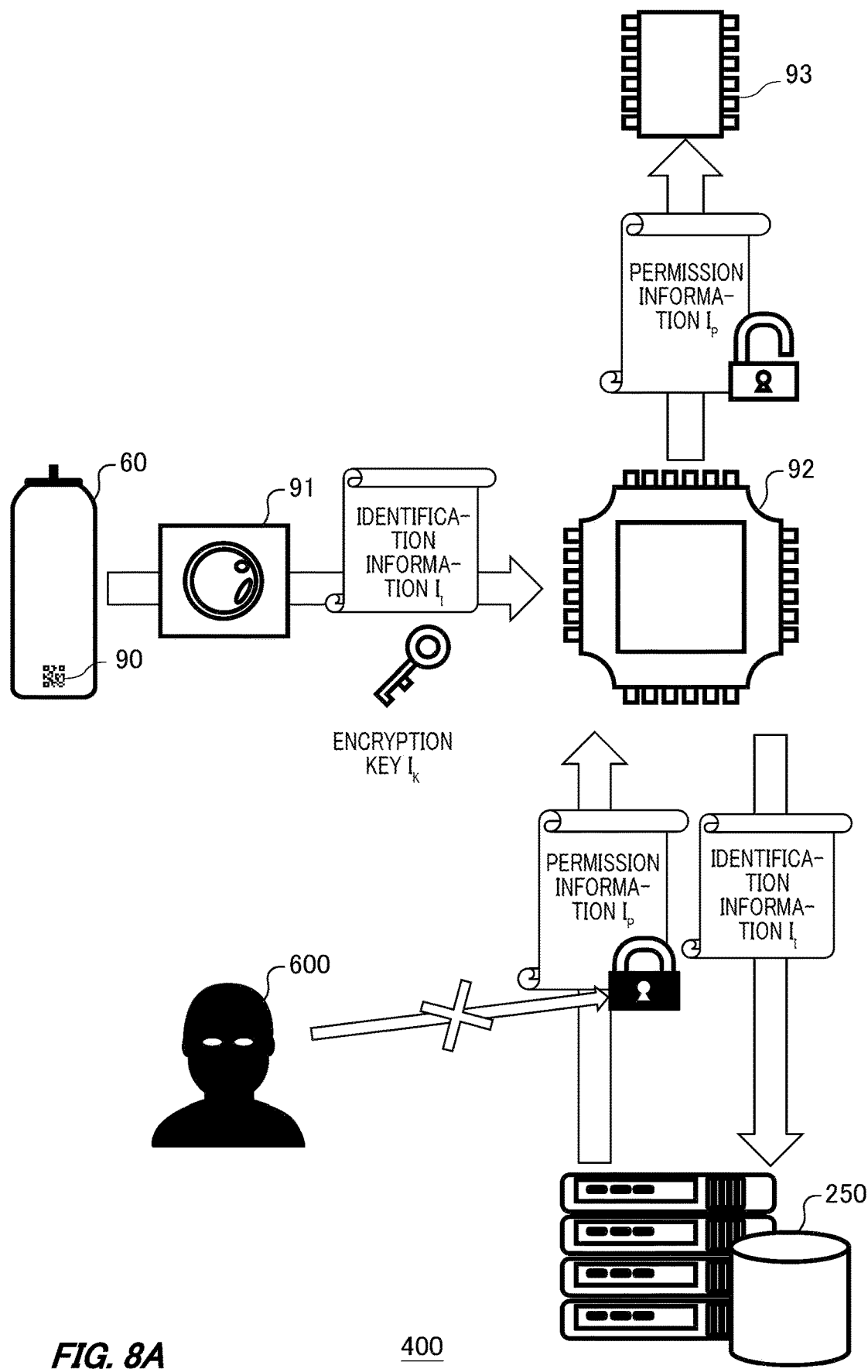
FIG. 8A shows an exemplary method of operating the discharge system 400.

FIG. 8A shows an exemplary method of operating the discharge system 400. This example illustrates the exemplary method of operating the discharge system 400 using an encryption key $I_k$.

The container information 90 includes the identification information $I_I$ that enables a container 60 to be individually identified. The identification information $I_I$ differs for each individual container 60. The container information 90 includes the encryption key $I_k$ for decoding the permission information $I_P$ that is encrypted. Having the encryption key $I_k$ allows decoding the permission information $I_P$ of the container 60 corresponding to said encryption key $I_k$.

The container information acquisition unit 91 acquires the identification information $I_I$ and the encryption key $I_k$ from the container information 90. The container information acquisition unit 91 transmits the acquired identification information $I_I$ and encryption key $I_k$ to the permission information processing unit 92.

The permission information processing unit 92 transmits the identification information $I_I$ to the computer 250. The computer 250 transmits the permission information $I_P$ corresponding to the received identification information $I_I$ to the permission information processing unit 92. Since the permission information $I_P$ is encrypted, a malicious person 600 may acquire it but cannot decipher it. The permission information processing unit 92 then decrypts the encrypted permission information $I_P$ with the encryption key $I_k$ to acquire the permission information $I_P$. The permission information processing unit 92 transmits the decoded permission information $I_P$ to the discharge control unit 93.

The discharge system 400 in this example provides the encryption key $I_k$ for the container information 90 to encrypt the permission information $I_P$, thereby preventing the permission information $I_P$ from being leaked to the malicious person 600. Accordingly, the permission information $I_P$ corresponding to the identification information $I_I$ of the container 60 can be acquired more safely.

Note that the permission information processing unit 92 may communicate directly with the computer 250 using an LTE line or the like, or may communicate with the computer 250 via the terminal device 200. The unmanned aircraft 100 may utilize temporarily cached information from a database. It allows the unmanned aircraft 100 to operate even in an environment that disturbs communications with the outside, such as mountains or offshore.

Figure 8B:
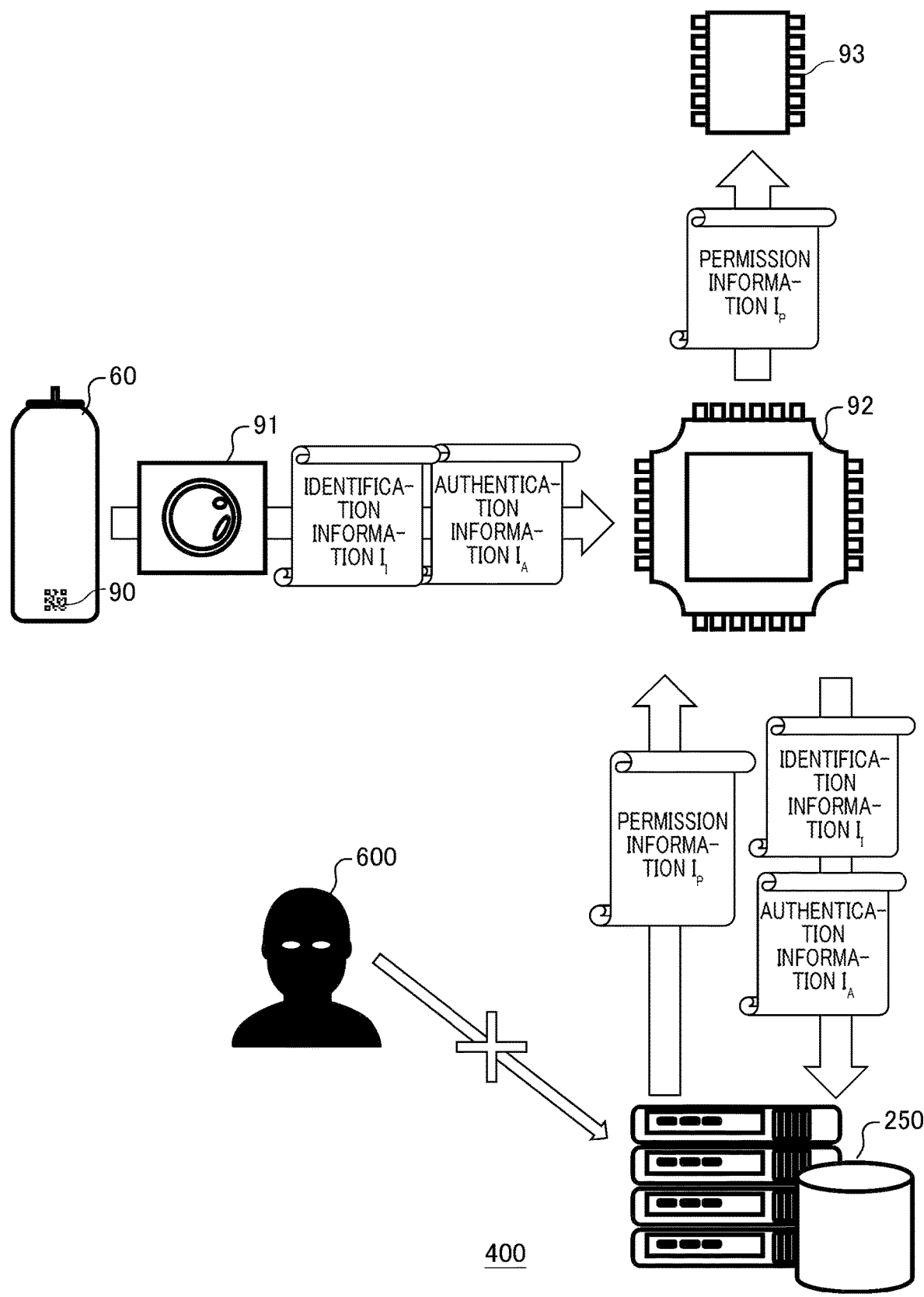
FIG. 8B shows an exemplary method of operating the discharge system 400.

FIG. 8B shows an exemplary method of operating the discharge system 400. This example illustrates the exemplary method of operating the discharge system 400 using authentication information $I_A$.

The container information 90 includes the identification information $I_I$ and the authentication information $I_A$. The authentication information $I_A$ is the information for accessing the computer 250. Having the authentication information $I_A$ allows acquiring the permission information $I_P$ stored on the computer 250.

The container information acquisition unit 91 acquires the identification information $I_I$ and the authentication information $I_A$ from the container information 90. The container information acquisition unit 91 transmits the acquired identification information $I_I$ and authentication information $I_A$ to the permission information processing unit 92.

The permission information processing unit 92 transmits the identification information $I_I$ and the authentication information $I_A$ to the computer 250. The permission information processing unit 92 is individually authenticated by the computer 250 using the authentication information $I_A$, and receives the permission information $I_P$ corresponding to the identification information $I_I$. The permission information processing unit 92 transmits the permission information $I_P$ to the discharge control unit 93.

The discharge system 400 in this example requires the authentication information $I_A$ upon acquiring the permission information $I_P$, which can prohibit access by the malicious person 600. Accordingly, the permission information $I_P$ corresponding to the identification information $I_I$ of the container 60 can be acquired more safely.

Figure 8C:
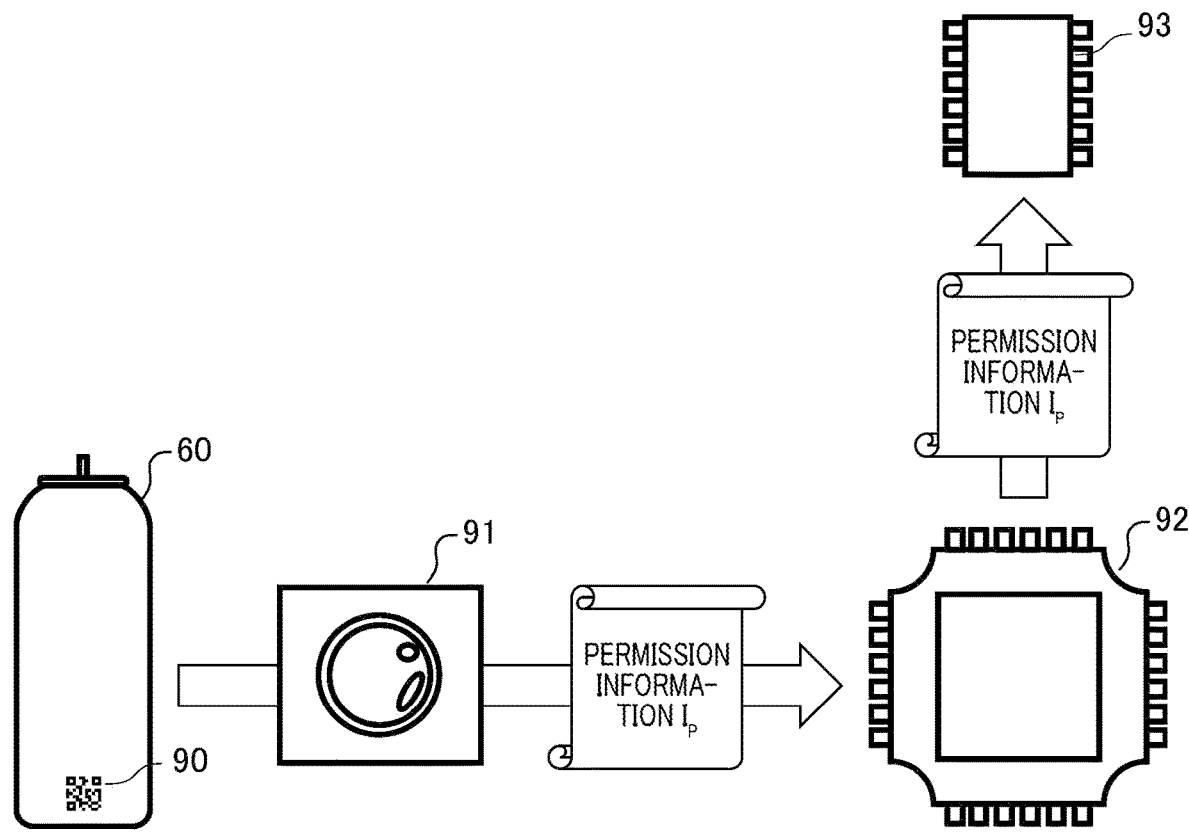
FIG. 8C shows an exemplary method of operating the discharge system 400.

FIG. 8C shows an exemplary method of operating the discharge system 400. This example illustrates the exemplary method of operating the discharge system 400 wherein the container information 90 includes the permission information $I_P$.

The container information acquisition unit 91 acquires the permission information $I_P$ from the container information 90. The permission information processing unit 92 in this example can acquire the permission information $I_P$ directly from the container information acquisition unit 91. The container information acquisition unit 91 transmits the permission information $I_P$ to the permission information processing unit 92.

The permission information processing unit 92 acquires the permission information $I_P$ from the container information acquisition unit 91. Thus, the permission information processing unit 92 does not need to access an external database to acquire the permission information $I_P$. Accordingly, the discharge system 400 can be simplified. The permission information processing unit 92 transmits the permission information $I_P$ to the discharge control unit 93. The discharge control unit 93 limits or enables discharge at the discharge unit 50 according to the permission information $I_P$.

Figure 9:
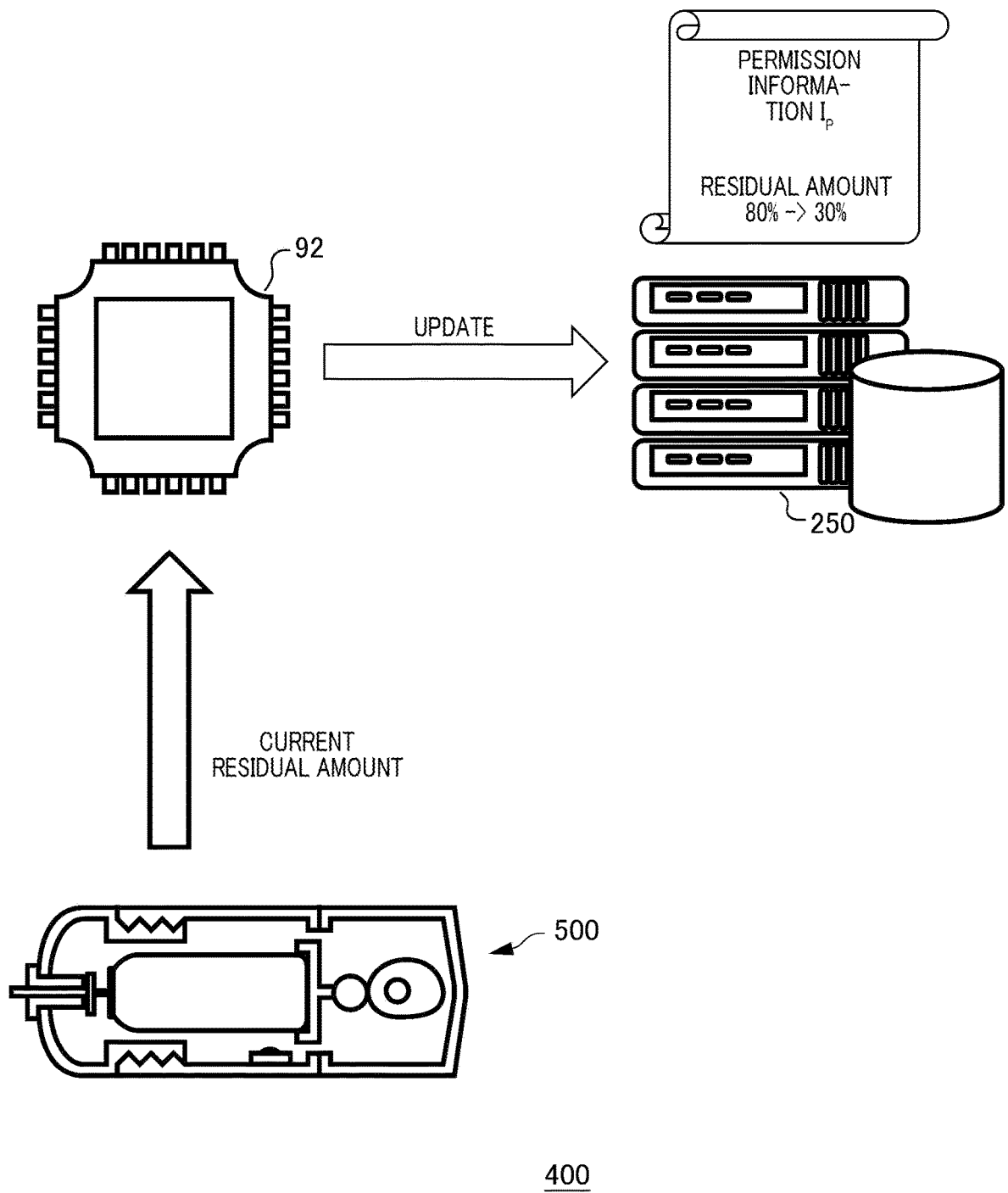
FIG. 9 shows an exemplary discharge system 400 that manages a residual amount in the container 60.

FIG. 9 shows an exemplary discharge system 400 that manages the residual amount in the container 60. The permission information processing unit 92 in this example updates the residual amount in the container 60 stored in the computer 250.

The discharge device 500 acquires the container information 90 by the container information acquisition unit 91. The discharge device 500 also acquires the total discharge time of the container 60. With the knowledge of the container information 90 and the total discharge time, the residual amount in the container 60 can be calculated. The residual amount in the container 60 may be calculated either in the discharge device 500 or externally to the discharge device 500.

The permission information processing unit 92 acquires the container information 90 and the total discharge time from the discharge device 500. The permission information processing unit 92 may acquire the residual amount in the container 60 from the discharge device 500. The permission information processing unit 92 comprises means of communication with the externally provided computer 250 to transmit the information acquired from the discharge device 500 to the computer 250.

The computer 250 updates the residual amount in the container 60 according to the information received from the permission information processing unit 92. The computer 250 in this example receives the residual amount in the container 60 from the permission information processing unit 92. The computer 250 may calculate the residual amount in the container 60 based on the container information 90 and the total discharge time. For example, the computer 250 updates content of the permission information $I_P$. By updating the content of the permission information $I_P$, discharge from the container 60 can be permitted or not according to the latest residual amount in the container 60.

Note that the can manufacturer of the container 60 may adjust the manufacture of cans depending on the discharge condition. The filling trader of the contents may adjust the manufacture of the containers 60 depending on the discharge condition. The user of the unmanned aircraft 100 may confirm excess and deficiency of inventory of the containers 60 or confirm the progress of activities depending on the discharge condition.

Figure 10A:
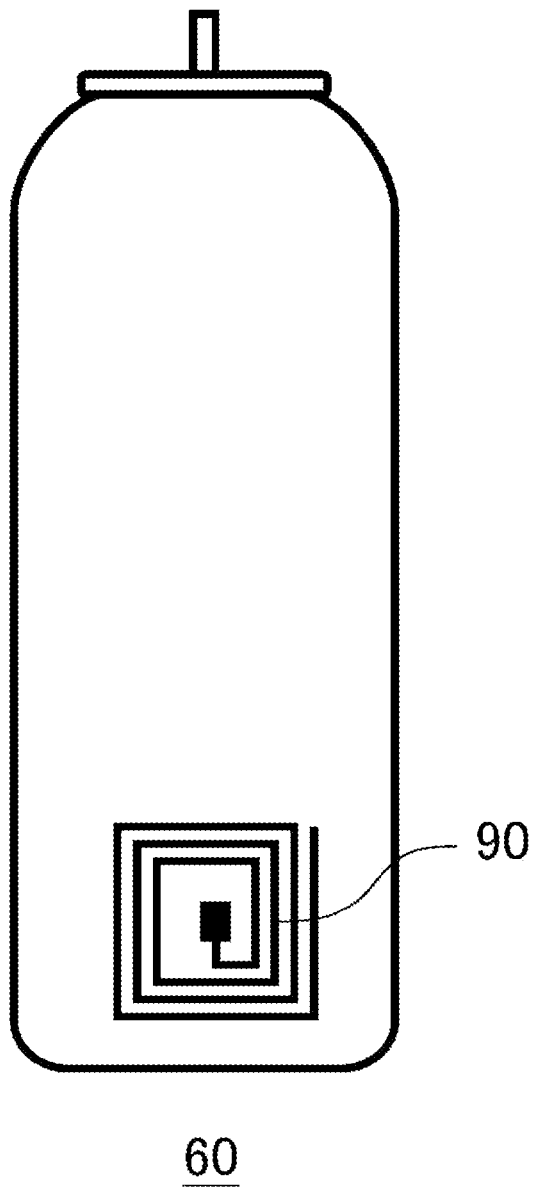
FIG. 10A shows an exemplary container 60 having the container information 90 compatible with wireless communication.

FIG. 10A shows an exemplary container 60 having the container information 90 compatible with wireless communication. The container information 90 may have a wireless communication device such as an RFID. The container information acquisition unit 91 acquires the container information 90 via wireless communication. The container information 90 in this example is provided on the outer surface of the container 60. The container information acquisition unit 91 may be provided to an arbitrary position of the unmanned aircraft 100, not necessarily to the container holding unit 40. When the plurality of container holding units 40 are provided, each container holding unit 40 may not be necessarily provided with the container information acquisition unit 91. The container information acquisition unit 91 may be provided commonly to the plurality of container holding unit 40.

Figure 10B:
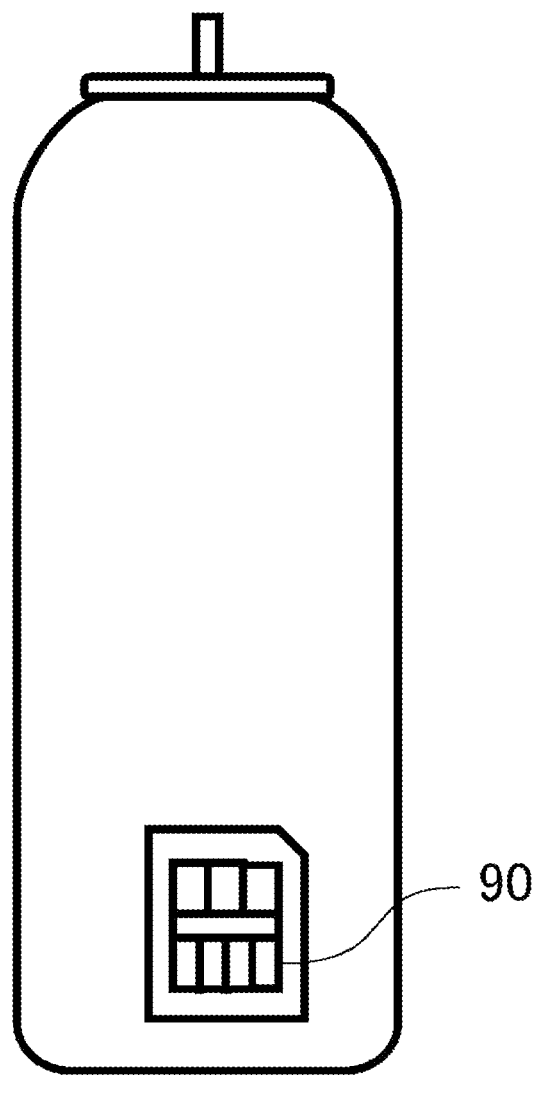
FIG. 10B shows an exemplary container 60 having the container information 90 compatible with contact communication.

FIG. 10B shows an exemplary container 60 having the container information 90 compatible with contact communication. The container information 90 in this example has a semiconductor device that is readable via telecommunications. For example, the container information 90 has a touch communication device such as a SIM card. The container information 90 in this example is provided on the outer surface of the container 60. The container information acquisition unit 91 is provided to the position of the container holding unit 40 where it can be connected with the container information 90.

Figure 11A:
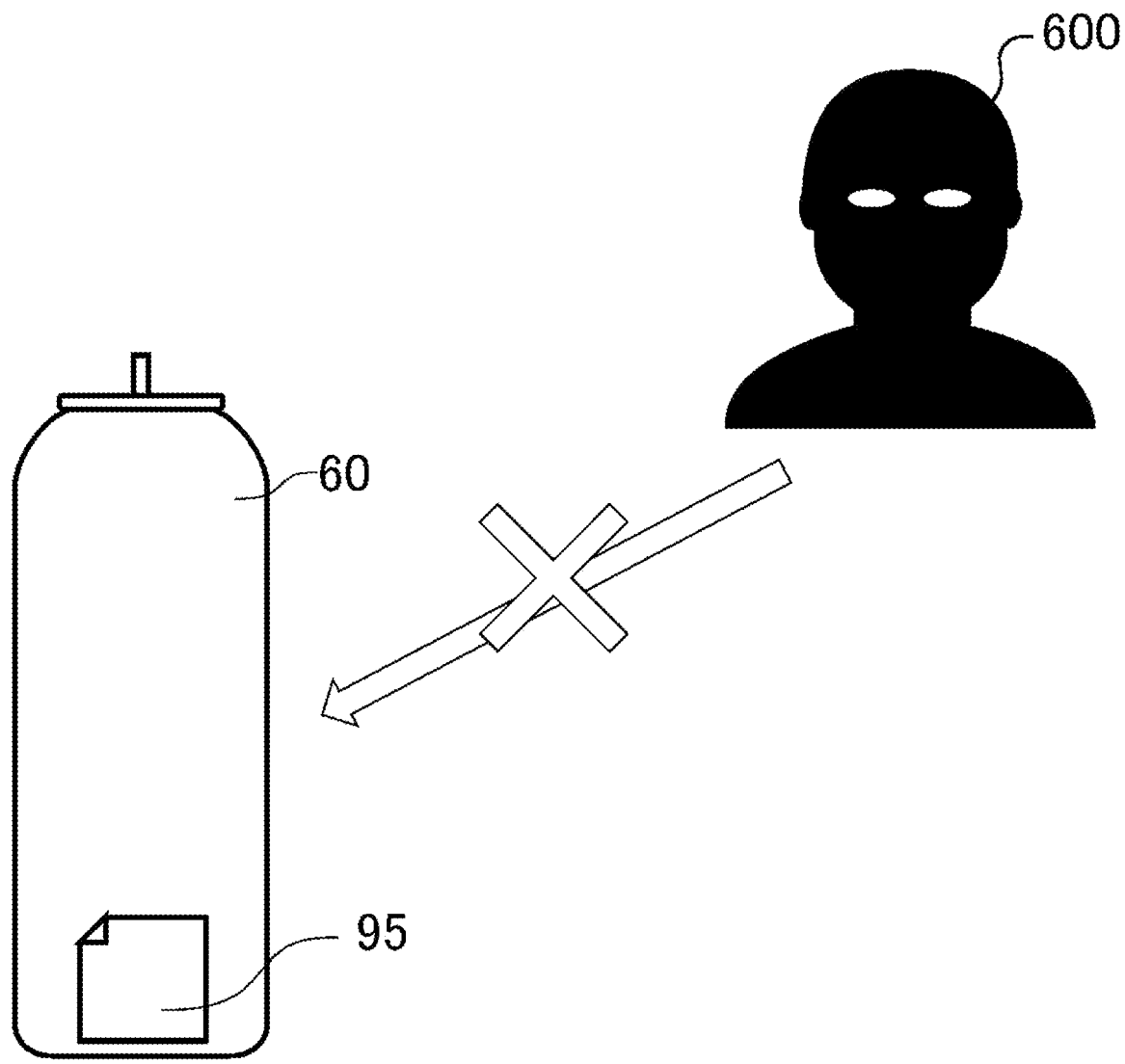
FIG. 11A shows exemplary concealing means 95 that has concealed the container information 90.

FIG. 11A shows exemplary concealing means 95 that has concealed the container information 90. The concealing means 95 conceals the container information 90 by means of releasable concealing means.

Concealment refers to prohibition of access by an unauthorized person to the container information 90. The concealing means may mean physically hiding the container information 90 from the outside or electronically prohibiting access to the container information 90.

The concealing means 95 in this example covers the container information 90 to conceal it so that it cannot be seen from the outside. When the container information 90 is a two-dimensional bar code that is acquired visually, the concealing means 95 covers the container information 90 and thus the malicious person 600 cannot acquire the container information 90. For example, the concealing means 95 is provided by peelable coating. The concealing means 95 may also be a peelable sticker.

Note that, when the container information 90 is acquired by the container information acquisition unit 91 via wireless communication, the concealing means 95 may be a communication jamming device for wireless communication.

The concealing means 95 prohibits access by the malicious person 600 to the container information 90 via wireless communication means.

Figure 11B:
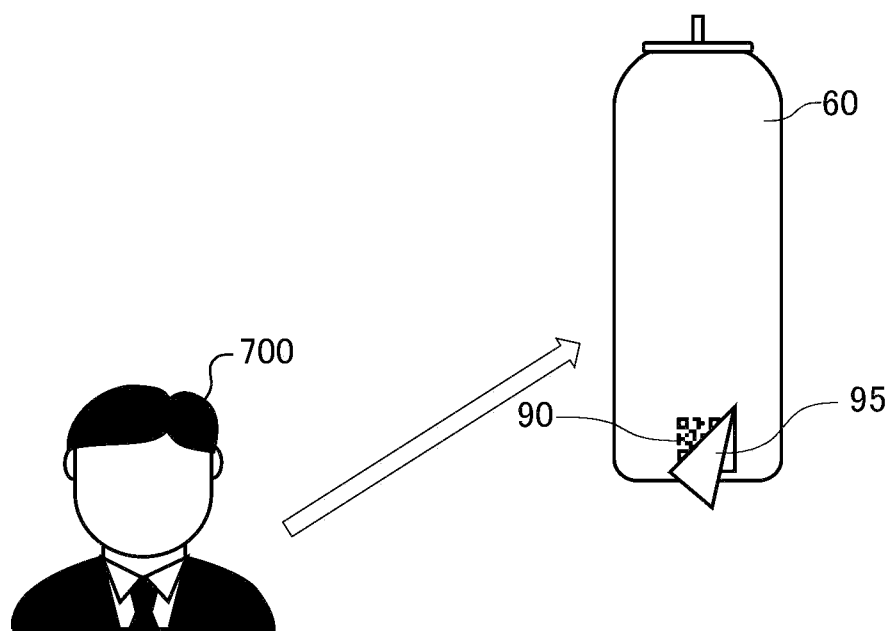
FIG. 11B shows exemplary concealing means 95 that has released the concealment of the container information 90.

FIG. 11B shows exemplary concealing means 95 that has released concealment of the container information 90. Since concealment of the container information 90 has been released, an administrator 700 can acquire the container information 90. When the container information 90 is a two-dimensional bar code that is acquired visually, the concealed state of the container information 90 has been released by peeling the concealing means 95. The concealing means 95 may be either physical concealing means or electronic concealing means.

Figure 12A:
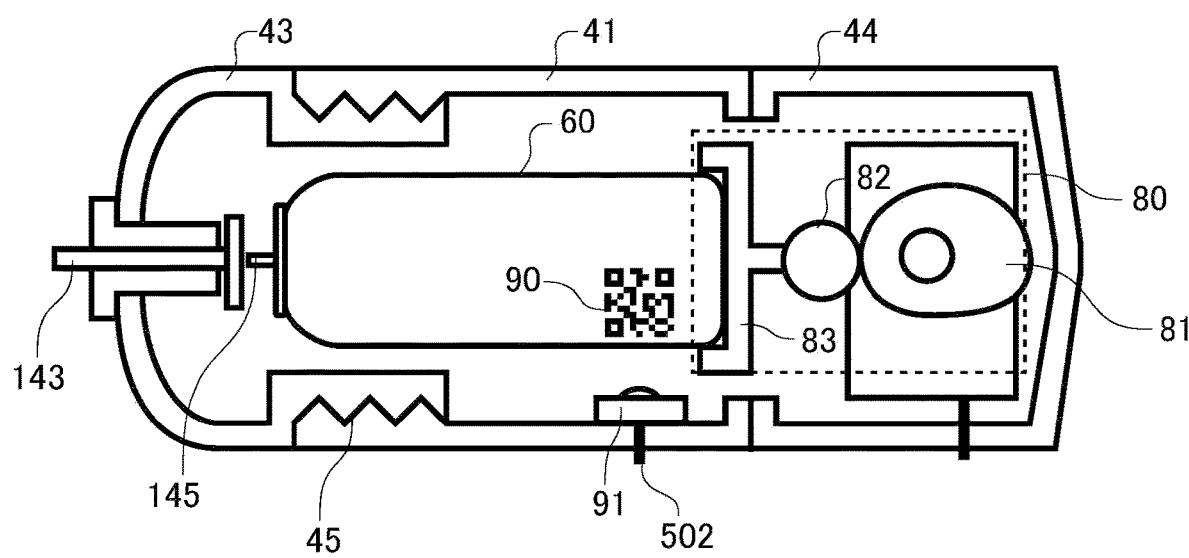
FIG. 12A shows an exemplary cross-sectional view of a discharge device 500.
Figure 12B:
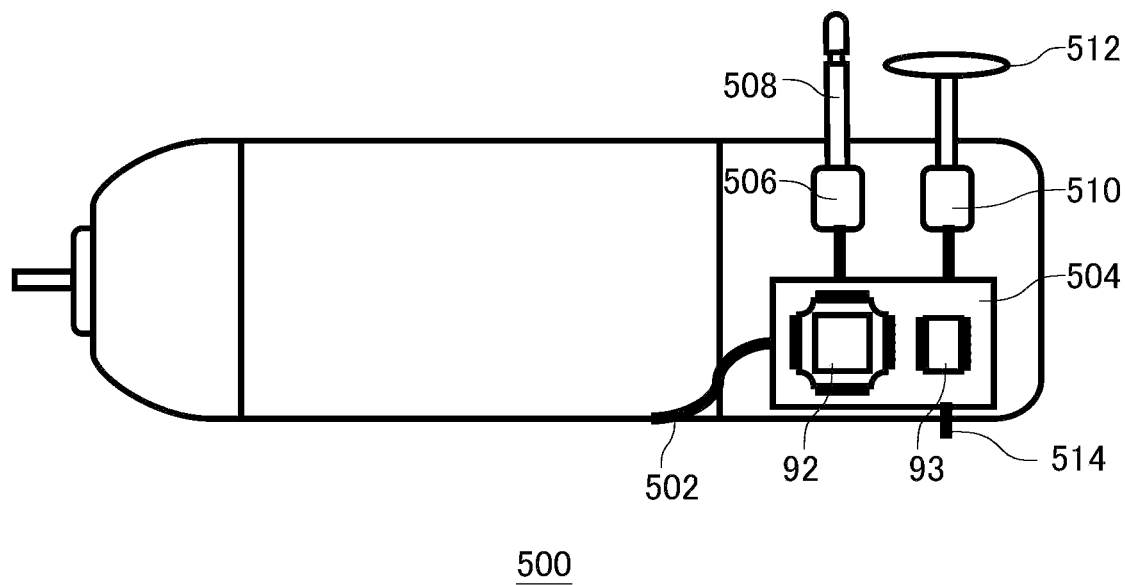
FIG. 12B shows an exemplary side view of the discharge device 500.

FIG. 12A shows an exemplary cross-sectional view of the discharge device 500. FIG. 12B shows an exemplary side view of the discharge device 500. The discharge device 500 in this example has functions from the acquisition of the container information 90 to the control. That is, the discharge device 500 in this example comprises the function of the discharge system 400.

A cable 502 is connected with the container information acquisition unit 91 and transmits information acquired by the container information acquisition unit 91 to a circuit board 504. The circuit board 504 comprises the permission information processing unit 92 and the discharge control unit 93. A communication device 506 transmits and receives data to/from the external computer 250 or the like via an antenna 508. A communication system employed by the communication device 506 is not limited specifically. A position information acquisition unit 510 acquires current position information of the unmanned aircraft 100 via an antenna 512. The position information acquisition unit 510 has a GPS signal processor and an altimeter. The discharge control unit 93 limits or enables discharge of the discharge unit 50. The discharge control unit 93 drives the discharge drive unit 80 according to a discharge signal from a cable 514 when the limitation of discharge is released.

While the present invention has been described with reference to the embodiments, the technical scope of the invention is not limited to the above described embodiments. It is apparent to persons skilled in the art that various alterations or improvements can be added to the above-described embodiments. It is also apparent from the scope of the claims that the embodiments added with such alterations or improvements can be included in the technical scope of the invention.

It should be noted that the operations, procedures, steps, stages, and the like of each process performed by an apparatus, system, program, and method shown in the claims, specification, and diagrams can be performed in any order as long as the order is not explicitly indicated by terms such as "prior to" or "before" and as long as the output from a previous process is not used in a later process. Even if the process flow is described expediently using terms such as "first" or "next" in the claims, specification, or diagrams, it does not necessarily mean that the process must be performed in this order.

EXPLANATION OF REFERENCES

10: body unit
12: fixed camera
15: leg unit
20: propelling unit
21: rotary blade
22: rotation drive unit
24: arm unit
30: movable camera
32: coupling unit
40: container holding unit
41: body
42: coupling unit
43: first end cover unit
44: second end cover unit
45: screw unit
50: discharge unit
51: discharge port
52: extension unit
60: container
80: discharge drive unit
81: cam
82: cam follower
83: movable plate
90: container information
91: container information acquisition unit
92: permission information processing unit
93: discharge control unit
95: concealing means
143: actuator
145: stem
100: unmanned aircraft
200: terminal device
210: display unit
220: controller
250: computer
300: maneuvering system
400: discharge system
500: discharge device
502: cable
504: circuit board
506: communication device
508: antenna
510: position information acquisition unit
512: antenna
514: cable
600: malicious person
700: administrator

What is claimed is:

1. An unmanned aircraft including a discharge system comprising:
    a container holding unit configured to hold a container;
    a discharge drive unit configured to discharge contents from the container;
    a container information acquisition unit configured to read container information applied to the container;
    a permission information processing unit configured to process the container information to acquire permission information; and
    a discharge control unit configured to limit or enable discharge at the discharge drive unit according to the permission information; wherein the container information is provided on an outer surface of the container and applied to a semiconductor device that is readable via telecommunications, or
    the container information acquisition unit is configured to acquire the container information via wireless communication; and
    the container information acquisition unit is provided on the container holding unit.

2. The discharge system according to claim 1, wherein:
    the discharge control unit is configured to use position information included in the permission information for control.

3. The discharge system according to claim 1, wherein:
the discharge control unit is configured to use period information included in the permission information for control.

4. The discharge system according to claim 1, wherein:
the discharge control unit is configured to use user information of the container included in the permission information for control.

5. The discharge system according to claim 1, wherein:
the discharge control unit is configured to use term-of-use information of the container included in the permission information for control.

6. The discharge system according to claim 1, wherein:
the discharge control unit is configured to use residual amount information of the container included in the permission information for control.

7. The discharge system according to claim 1, wherein:
the container information includes an encryption key to decode the permission information that is encrypted.

8. The discharge system according to claim 1, wherein:
the container information includes authentication information for a computer required upon acquiring the permission information stored on the computer.

9. The discharge system according to claim 1, wherein:
the container information includes identification information that enables the container to be individually identified.

10. The discharge system according to claim 1, wherein:
the container information includes the permission information.

11. The discharge system according to claim 1, wherein:
the container information is applied on an outer surface of the container in a readable manner by visual means; or
plural pieces of the container information are arranged spaced apart in an outer circumferential direction of the container and at the same position in an axial direction.

12. The discharge system according to claim 1, wherein:
the container is an aerosol container.

13. The discharge system according to claim 1, wherein:
the permission information processing unit is configured to:
process the container information acquired by the container information acquisition unit;
acquire the permission information from the container information; and
transmit the permission information to the discharge control unit, or
the permission information processing unit comprises means of communication with a computer that is provided externally, and
is configured to acquire information including the permission information from the computer, or
the permission information processing unit comprises means of communication with a computer that is provided externally, and
is configured to update content of the permission information.

14. The discharge system according to claim 1, wherein:
the container information is provided on an outer surface of the container and applied to a semiconductor device that is readable via telecommunications.

15. The discharge system according to claim 1, wherein:
the container information acquisition unit is configured to acquire the container information via wireless communication.

16. A discharge device of an aerosol container, the discharge device comprising the discharge system according to claim 1.

17. An unmanned aircraft to which an aerosol container can be mounted, the unmanned aircraft comprising the discharge system according to claim 1.

18. A maneuvering system of an unmanned aircraft, comprising: the unmanned aircraft according to claim 17; and auxiliary equipment of the unmanned aircraft.

* * * * *